United States Patent
Rozen

(10) Patent No.: US 7,587,500 B2
(45) Date of Patent: Sep. 8, 2009

(54) DISTRIBUTED SELECTION OF A CONTENT SERVER

(75) Inventor: John Rozen, Boxford, MA (US)

(73) Assignee: Xcelera, Woburn, MA (US)

( * ) Notice: Subject to any disclaimer, the term of this patent is extended or adjusted under 35 U.S.C. 154(b) by 1761 days.

(21) Appl. No.: 09/757,745

(22) Filed: Jan. 10, 2001

(65) Prior Publication Data

US 2002/0091760 A1  Jul. 11, 2002

(51) Int. Cl.
 *G06F 15/16* (2006.01)
 *G06F 15/173* (2006.01)

(52) U.S. Cl. ..................... 709/229; 709/240

(58) Field of Classification Search ............... 709/220, 709/222, 224, 225, 226, 227, 238–245, 249
 See application file for complete search history.

(56) References Cited

U.S. PATENT DOCUMENTS

| | | | | |
|---|---|---|---|---|
| 5,377,327 A | * | 12/1994 | Jain et al. | 709/235 |
| 6,052,718 A | * | 4/2000 | Gifford | 709/219 |
| 6,212,570 B1 | * | 4/2001 | Hasebe et al. | 709/238 |
| 6,351,775 B1 | * | 2/2002 | Yu | 709/238 |
| 6,526,448 B1 | * | 2/2003 | Blewett | 709/238 |
| 6,665,702 B1 | * | 12/2003 | Zisapel et al. | 718/105 |
| 6,789,125 B1 | * | 9/2004 | Aviani et al. | 709/238 |

FOREIGN PATENT DOCUMENTS

| | | |
|---|---|---|
| EP | 0964 561 A2 | 4/1999 |
| WO | WO 00/52906 | 9/2000 |

OTHER PUBLICATIONS

W. Richard Stevens, Gary R. Wright, TCP/IP illustrated, vol. 1: The Protocols, Reading, Mass.: Addison-Wesley Pub. Co., c1994., ISBN: 0201633469, pp. 138-139.*
RFC 1267 [Lougheed and Rekhter 1991].*
P. Mockapetris, RFC 1035, Nov. 1987.*
"A Passive System for Server Selection within Mirrored Resource Environments Using AS Path Length Heuristics" by Patrick R. McManus, Applied Theory Communications, Inc., pp. 1-10.
Damani et al., "ONE-IP: techniques for hosting a service on cluster of machines", *Computer Networks and ISDN Systems*, vol. 29, pp. 1019-1027, 1997.
Pultar, Giray, "Automatically Selecting a Close Mirror Based on Network Topology", *LISA XII*, Abstract, XP-002211408, pp. 159-165, Dec. 1998.
International Search Report, Oct. 9, 2002.

* cited by examiner

*Primary Examiner*—Yasin M Barqadle
(74) *Attorney, Agent, or Firm*—Fish & Richardson P.C.

(57) ABSTRACT

A method for directing a client to a content server containing desired content by providing the client with an address shared by a plurality of content servers, each of which has a copy of the desired content. The client is then served from an optimal, or closest available content server selected from the plurality of content servers. This optimal content server is selected on the basis of an optimal path from the client to the shared address.

11 Claims, 3 Drawing Sheets

DISTRIBUTED SELECTION OF A CONTENT SERVER

This application relates to content delivery systems, and in particular, to selecting a content server for delivery of content to a client.

BACKGROUND

To retrieve a web-page, a user typically provides, to a web-browser running on that user's computer, a URL (uniform resource locator) identifying an origin server that contains the desired web-page. In response, the user's computer sends a message to a domain-name server requesting a numerical IP address for the origin server identified by that URL. The domain-name server then responds, perhaps after querying other domain-name servers, with the IP address of the origin server.

After having learned the IP address for the origin server, the web-browser sends that origin server a message requesting the desired web-page. In response, the origin server sends the desired web-page to the web-browser. This web-page generally includes text with embedded references to other types of content, such as graphic images (both moving and stationary), audio clips, and other data-rich content. Once the web-browser receives the desired web-page, it interprets it to determine what content it needs to gather and how to assemble that content to correctly display the desired web-page to the user.

In the foregoing content-delivery system, the origin server and the web-browser are frequently located on different networks at different locations. As a result, the origin server and the web-browser typically communicate across the internet. Data communications across the internet can result in substantial delays arising from, among other causes, router congestion, packet loss, and sub-optimal path selection.

To improve their performance, content-delivery systems often replicate content at content servers that are dispersed throughout the internet. Such distributed content-delivery systems relieve network congestion by delegating the serving of data-rich content to an optimal content-server that is logically (and in many cases physically) closer to the user's computer than other content servers. Because the path between the optimal content-server and the user's computer is the logically shortest, the likelihood of encountering network congestion along that path is minimized.

A conventional distributed content-delivery systems selects an optimal content-server on the basis of location and route information that has been gathered into a centralized mapping database. This selection is then communicated to the web-browser as a modified URL. The web-browser then provides the modified URL to a domain-name server, which directs the browser to a resolving server. On the basis of the requesting domain-name server's IP address, the resolving server translates the modified URL into the IP address of the optimal content-server. This IP address is then provided to the web-browser. Finally, the web-browser uses this IP address to contact the optimal content-server.

In a distributed content-delivery system as described above, the resolving server typically maintains a mapping database that identifies the optimal content-server for a particular IP address. The resolving server uses this mapping database to return an IP address of an optimal content-server on the basis of the IP address of the domain-name server that requested resolution. This relies heavily on the assumption that this domain-name server and the user's computer are proximate to each other.

A consequence of the above mechanism for communicating the IP address of the optimal content-server to the user is the additional interaction with the domain-name server. This interaction, whose only purpose is to obtain an IP address from a resolving server, introduces additional latency into the overall content-delivery process.

The topology of the internet is a dynamically changing one. As a result, in order to maintain optimal performance of the conventional content-delivery system, the mapping database is periodically updated to reflect changes in network topology. Updating this mapping database is a significant undertaking. Moreover, since the network topology changes more often than the mapping database can reasonably be updated, the mapping database is rapidly rendered obsolete.

SUMMARY

A content delivery system incorporating the invention causes a client to be connected to a closest available content server without specifying in advance which content server is the closest available content server. In the content delivery system of the invention, the origin server, from which the client first requests content, needs to know only what content is requested and which content servers can serve that content. Neither the origin server, nor any other server associated with the content delivery system, needs to know which of those content servers is the client's closest available content server.

The content delivery system of the invention exploits the fact that the routers that interconnect autonomous systems on the internet already cooperate among themselves to identify the best path from one autonomous system to another. These routers periodically communicate with each other to identify trouble-spots along each path and to update the best path to circumvent those trouble spots. By allowing the routers to collectively choose the client's closest available content server, the content delivery system of the invention avoids having to acquire the network specific knowledge that the routers have already accumulated in the course of their operation.

The invention provides a method for directing a client to a content server containing desired content by providing the client with an address shared by a plurality of content servers, each of the content servers having a copy of the desired content. The client is then served from an optimal, or closest available content server selected from the plurality of content servers. This optimal content server is selected on the basis of an optimal path from the client to the shared address.

In one practice of the invention, the client requests a connection to a content server having the shared address. This triggers the identification of an optimal path between the client and the shared address. The content server on this optimal path is then designated as the client's optimal, or closest available content server. The plurality of content servers are typically grouped into an autonomous system and the routers implement a BGP protocol that enables them to identify the optimal path to an autonomous system.

A content delivery system for practice of the invention includes a first content server and a second content server having content in common with the first content server. The first and second content servers have a shared address. The system includes a first router for relaying messages to the first content server, and a second router for relaying messages to the second content server. In one embodiment of the content delivery system, the first and second content servers are grouped into an autonomous system. In this case, the first and second routers can be BGP routers.

These and other features of the invention will be apparent from a review of the following detailed description and the accompanying figures, in which:

DETAILED DESCRIPTION

In a content delivery system according to the invention, an origin server provides a browser with an address shared by a set of content servers, all of which belong to the same autonomous system. The selection of which particular content server is the optimal content server is made by the cooperation of BGP routers between the browser and the routers leading to the autonomous system to which the content servers belong. In effect, the content delivery system relies on routing information that is already distributed among the routers that connect autonomous systems on the internet.

Figure 1:
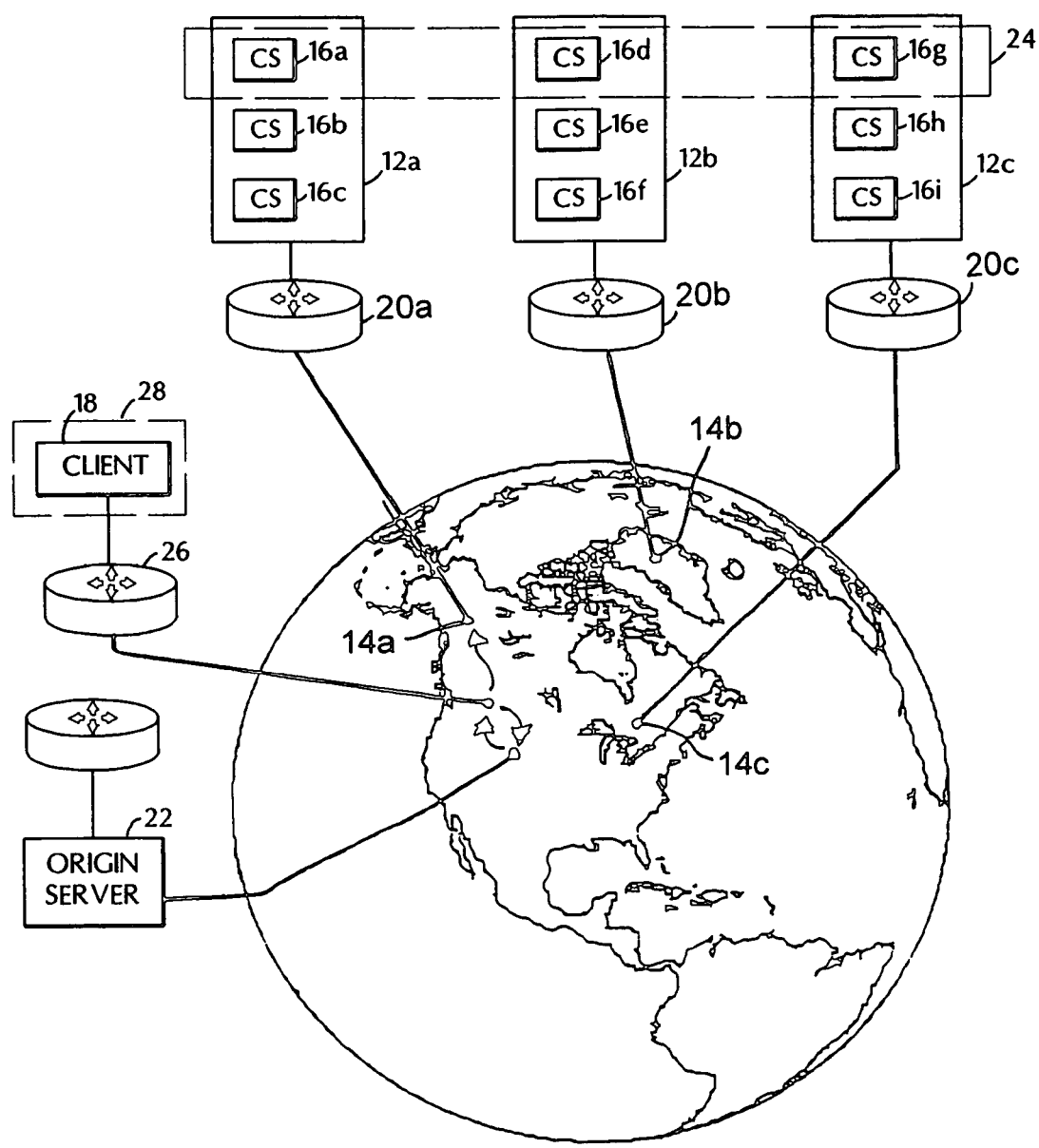
FIG. 1 is a block diagram of a content delivery system.

Referring to FIG. 1, a content delivery system 10 includes a first server farm 12a located at a first site 14a. The first server farm 12a includes first 16a, second 16b, and third 16c content servers. The content servers 16a, 16b, 16c in the first server farm 12a are connected to the internet by a first BGP (border gateway protocol) router 20a.

The content delivery system 10 also includes second and third server farms 12b, 12c located at second and third sites 14b, 14c. The second server farm 12b includes fourth 16d, fifth 16e, and sixth 16f content servers, all of which are connected to the internet by a second BGP router 20b. Similarly, the third server farm 12c includes seventh 16g, eighth 16h, and ninth 16i content servers connected to the internet by a third BGP router 20c.

The content stored on the first content server 16a is replicated in the fourth content server 16d and in the seventh content server 16g. Similarly, content stored on the second content server 16b is replicated in the fifth and eighth content servers 16e, 16h, and content stored on the third content server 16c is replicated on the sixth 16f and ninth 16i content servers. The first, second, and third server farms 12a-c are thus capable of serving the same content.

As is apparent from FIG. 1, the content servers 16a-16i form a content-server matrix in which each column of the matrix corresponds to a server farm 12a-c at a particular geographic location 14a-c and each row of the matrix corresponds to set of content servers 16a, 16d, 16g that share the same content. For ease of exposition, FIG. 1 shows a particular content-server matrix having three rows and three columns. However, the scope of the invention is not limited to a specific number of rows and columns of the content-server matrix.

The task of specifying which content server 16a-16i is to deliver content to the client 18 can thus be decomposed into choosing a row and a column in the content-server matrix. The choice of a row depends on the specific content requested but does not depend on the physical location of the client 18 or on the topology of the network. The choice of a column does not depend on the specific content requested; it does, however, depend heavily on the network topology between the location of the client 18 and that of the individual server farms 12a-c.

In the prior art, these two choices are made by the content delivery system. Since the choice of a row depends only on the content requested, and since the content delivery system maintains complete control over the contents of each content server, there is little difficulty in selecting an appropriate row in the content-server matrix.

The choice of an appropriate column, however, is an entirely different matter. This choice depends on the location of the client, the location of each content server, and the network topology between the browser and each content server. To choose a column, the content delivery system must know about the topology of the network. The task of acquiring knowledge about the topology of the network, and then constantly updating that knowledge is a burdensome and computationally intensive task.

As the network grows, so too does the complexity of this task, until a point is reached at which the processing power of the content delivery system 10 becomes inadequate to maintain current knowledge of the network topology. When this occurs, the content delivery system 10 will begin to direct browsers to content servers that may have once been appropriate but no longer are. The content delivery system 10 is thus placed in the awkward position of being asked to give directions on the basis of an obsolete map.

In the present invention, the origin server 22 identifies the appropriate row of the content-server matrix. The task of identifying an appropriate column is distributed among routers between the client 18 and the various server farms 12a-12c. This is achieved by grouping the content servers 16a, 16d, 16g, in each row of the content-server matrix into an autonomous system 24. The content servers within an autonomous system 24 are then assigned a common IP address. A particular content server 16a thus has two addresses: a unique address to enable the origin server to communicate with that particular content server 16a directly, and a shared address that is common to all content servers 16a, 16d, 16g belonging to the autonomous system 24 to which the particular content server 16a belongs.

When a client 18 makes a request to the origin server 22 for particular content, the origin server 22 determines which autonomous system contains content servers that maintain copies of that content. The origin server 22 then looks up the shared IP address of the content servers belonging to that autonomous system and provides that shared IP address to the client 18. In doing so, the origin server 22 does not have to inquire at all into the client's location. Nor does the origin server 22 have to know anything about the network topology between the client 18 and the various server farms 12a-12c.

The client 18 sends a message requesting a connection to the shared IP address. This message eventually reaches a first BGP router 26 that connects the client's own autonomous system 28 to other autonomous systems on the internet. The first BGP router 26 maintains an autonomous-system table that lists all the autonomous systems on the internet together with a list of IP addresses that belong to each of those autonomous systems. The first BGP router 26 then uses this autonomous-system table to identify the autonomous system corresponding to the shared IP address.

Figure 2:
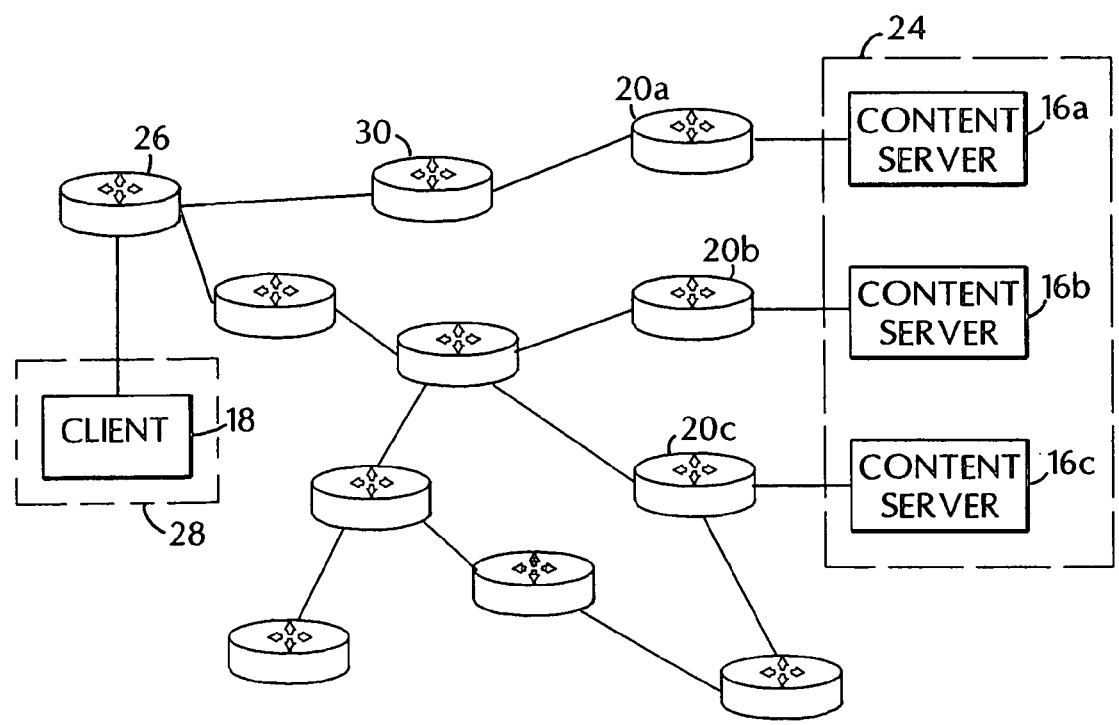
FIG. 2 is an example of a distribution of routers between a client and a set of content servers.

Once the first router 26 has determined the autonomous system to which content servers having the desired content belong, it uses its routing table to determine the best path from itself to that autonomous system. In the example shown in FIG. 2, the first router 26 recognizes that, of the various paths available to the autonomous system containing the content servers, there is one path that reaches that autonomous system in only two hops. The first router 26 than sends the message on its first hop to the next router 30 along that path.

Like the first router 26, the next router 30 maintains an autonomous system table and a routing table. The next router 30 thus functions the same way as the first router 26 and sends the message to the next router on the path, which happens to be the first router 20a that connects the first server farm 12a to the internet.

The content delivery system of the invention thus connects the client 18 to the optimal content server for that client 18 without having to know anything about the topology of the network. It does so by exploiting a map of the network topology that is collectively stored and updated by BGP routers as part of their routine function.

The method by which a client is directed to the closest content server is analogous to the method by which a stranger in a large city might find the nearest fire station. This stranger might approach a policeman at a corner and ask: "Where is the fire station?" The policeman, who presumably knows the paths to all the fire stations in the city, would identify the closest fire station and lead the stranger to the beginning of the best path to it. The stranger would then proceed along this path until he encountered a second policeman at a second corner. The stranger would then ask this second policeman the same question. This process would repeat itself until the stranger finally reached the nearest fire station.

It is significant in the foregoing example that the stranger need not know the street address of the closest fire station. Indeed, the stranger need not even know that there exists more than one fire station in the city. All the stranger is required to know, is that he wants to go to the nearest fire station and not, for example, to the nearest hospital.

Figure 3:
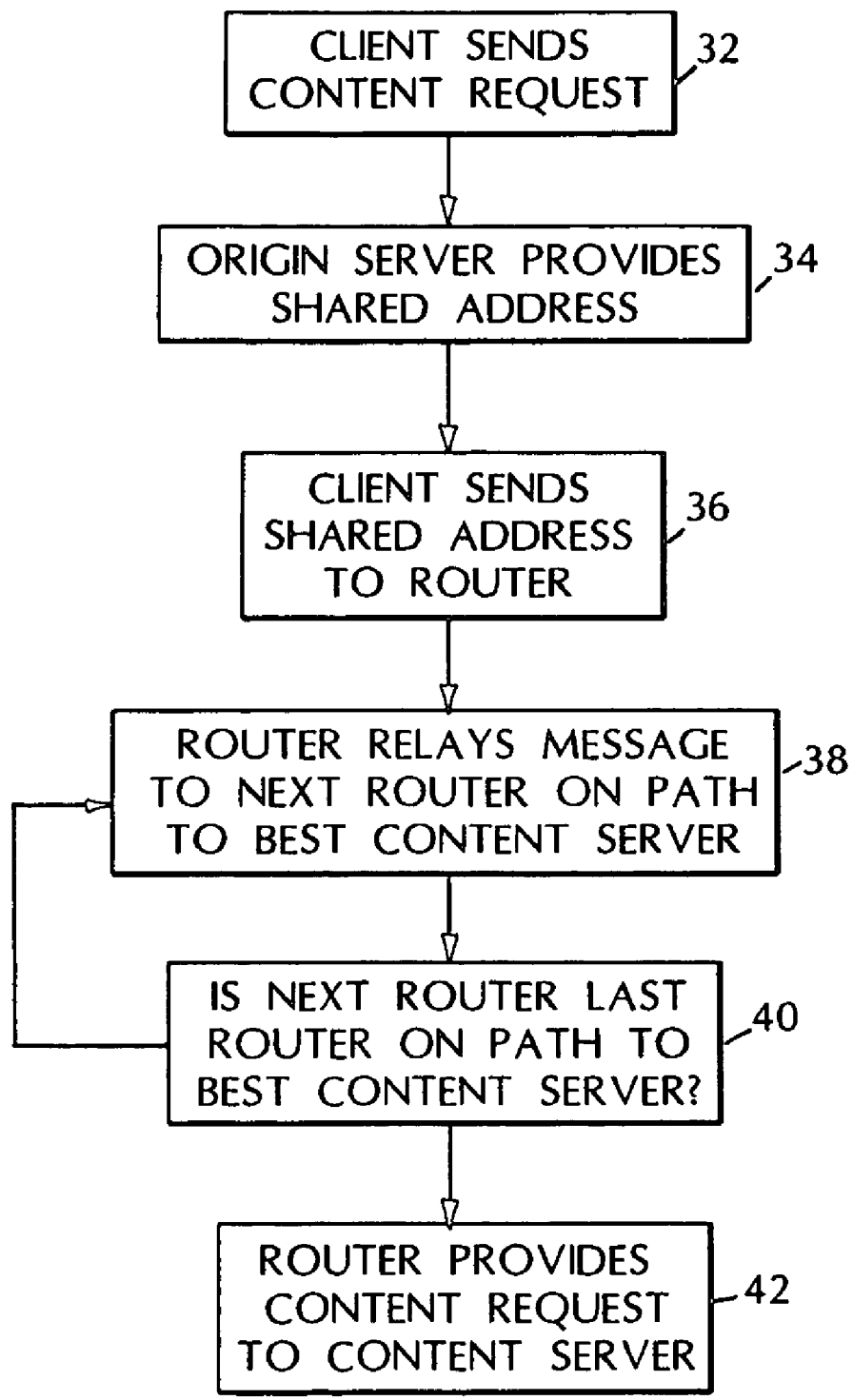
FIG. 3 is a flow chart of a method for selecting a closest available content server.

The method by which the content delivery system 10 of the invention causes the browser to be led to the closest available content server is illustrated in FIG. 3. The method begins with the browser sending 32 a request for content to an origin server.

The request for content contains information enabling the origin server to identify a set of content servers capable of satisfying that request. Each content server in the set shares the same address. The origin server does not know, and has no need to know, which content server from that set is the closest available content server for that client. In response to the request for content, the origin server sends 34 the browser the address shared by all the available content servers.

The browser gives 36 the shared address to a router, which then determines the best path to that address. The router then relays 38 the message to the next router on the best path. The next router on the best path then determines 40 whether it is the last router on the best path. If it is, it delivers 42 the message to one of the content servers identified by the shared address. Otherwise, it relays 38 the message to the next router on the best path.

The content delivery system of the invention thus causes a browser to connect to the closest available content server without having to know in advance the address of that content server. It does so by grouping together content servers sharing the same content and relying on the cooperation of the routers between the client and the content servers to resolve which of the content servers is the closes available content server.

The content delivery system of the invention thus reduces complexity by eliminating the need to identify the closest available content server on the basis of the client's location. The system also reduces software overhead by performing the task of selecting the closest available content server at the network layer rather than at the application layer. The system also increases reliability by dynamically re-routing messages in response to temporary outages along the paths leading to the content servers.

Having described the invention, and a preferred embodiment thereof, what I claim as new and secured by Letters Patent is:

1. A method for directing a client to a content server containing desired content, said method comprising:
    at an origin server separate from the content server, receiving a request from a client for desired content;
    in response to the request,
        identifying an autonomous system having a plurality of content servers, each of the content servers having a copy of the desired content, and
        providing said client with a shared address, said shared address being common to said content servers; and
    serving said client from an optimal content server selected from said plurality of content servers, said optimal content server having been selected on the basis of an optimal path from said client to said shared address.

2. The method of claim 1 wherein serving said client from an optimal content server comprises:
    receiving a request form said client to connect to a content server at said shared address;
    identifying an optimal path between said client and said shared address; and
    designating a content-server on said optimal path to be said optimal content-server.

3. The method of claim 2 further comprising directing said client to reach said optimal content-server by following said optimal path.

4. The method of claim 1 further comprising providing said shared address to a BGP router.

5. A content delivery system comprising:
    an autonomous system including a first content server and a second content server having content in common with said first content server;
    an origin server separate from the autonomous system for providing an address to a client in response to a request for content, the address identifying said autonomous system;
    a first router for relaying messages to said first content server; and
    a second router for relaying messages to said second content server.

6. The content delivery system of claim 5 wherein said first router is a BGP router.

7. A computer-readable medium having encoded thereon software for directing a client to a content server containing desired content, said software comprising instructions for:
    at an origin server separate from the content server, receiving a request from a client for desired content;
    in response to the request,
        identifying an autonomous system having a plurality of content servers, each of the content servers having a copy of the desired content, and
        providing said client with a shared address, said shared address being common to said content servers; and
    serving said client from an optimal content server selected from said plurality of content servers, said optimal content server having been selected on the basis of an optimal path from said client to said shared address.

8. The computer-readable medium of claim 7 wherein said instructions for serving said client from an optimal content server comprise instructions for:
    receiving a request from said client to connect to a content server at said shared address;

identifying an optimal path between said client and said shared address; and designating a content-server on said optimal path to be said optimal content-server.

9. The computer-readable medium of claim 8 wherein said software further comprises instructions for directing said client to reach said optimal content-server by following said optimal path.

10. The computer-readable medium of claim 7 said software further comprises instructions for grouping said plurality of content servers into an autonomous system.

11. The computer-readable medium of claim 10 said software further comprises instructions for said shared address to a BGP router.

* * * * *

UNITED STATES PATENT AND TRADEMARK OFFICE
CERTIFICATE OF CORRECTION

PATENT NO. : 7,587,500 B2
APPLICATION NO. : 09/757745
DATED : September 8, 2009
INVENTOR(S) : John Rozen Page 1 of 1

It is certified that error appears in the above-identified patent and that said Letters Patent is hereby corrected as shown below:

In column 6, please replace claim 2 with the following corrected version:

2. The method of claim 1 wherein serving said client from an optimal content server comprises:
    receiving a request [[form]] <u>from</u> said client to connect to a content server at said shared address;
    identifying an optimal path between said client and said shared address; and
    designating a content-server on said optimal path to be said optimal content-server.

Signed and Sealed this

Seventeenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,587,500 B2
APPLICATION NO. : 09/757745
DATED : September 8, 2009
INVENTOR(S) : John Rozen It is certified that error appears in the above-identified patent and that said Letters Patent is hereby corrected as shown below:

In column 6, lines 19-26, please replace claim 2 with the following corrected version:

2. The method of claim 1 wherein serving said client from an optimal content server comprises:

receiving a request from said client to connect to a content server at said shared address;

identifying an optimal path between said client and said shared address; and designating a content-server on said optimal path to be said optimal content-server.

This certificate supersedes the Certificate of Correction issued November 17, 2009.

Signed and Sealed this

Fifteenth Day of December, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,587,500 B2 | Page 1 of 1 |
| APPLICATION NO. | : 09/757745 | |
| DATED | : September 8, 2009 | |
| INVENTOR(S) | : John Rozen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2329 days.

Signed and Sealed this

Twenty-first Day of September, 2010

David J. Kappos
*Director of the United States Patent and Trademark Office*